Nov. 15, 1938.    M. G. SATEREN    2,137,097
JOINT STRUCTURE AND METHOD OF MAKING THE SAME
Filed Feb. 27, 1936    2 Sheets-Sheet 2

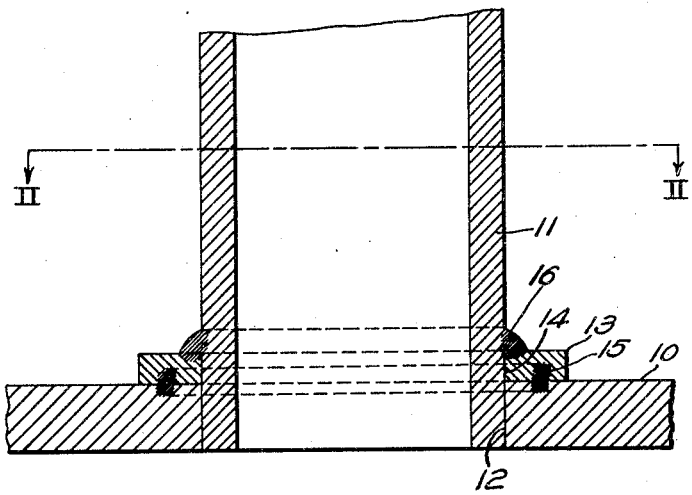
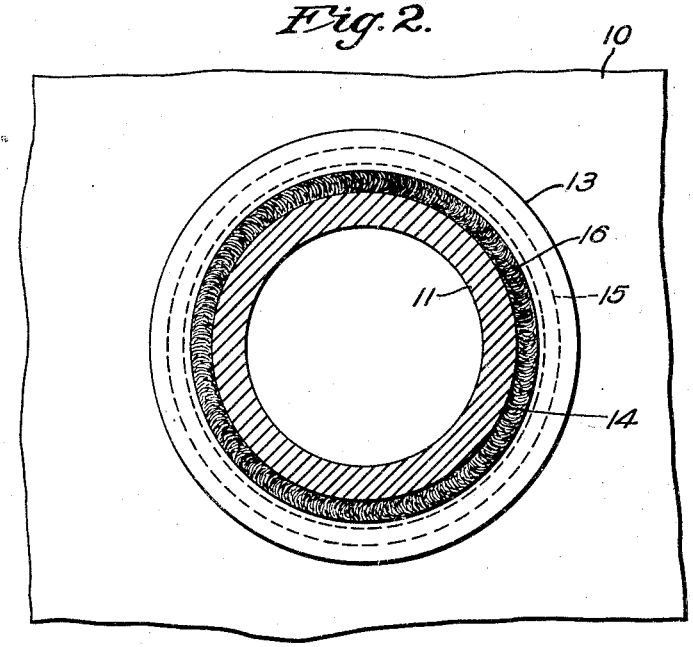

WITNESSES:

INVENTOR
Martin G. Sateren.
BY
ATTORNEY

Patented Nov. 15, 1938

2,137,097

UNITED STATES PATENT OFFICE 2,137,097

JOINT STRUCTURE AND METHOD OF MAKING THE SAME

Martin G. Sateren, West Springfield, Mass., assignor to Westinghouse Electric & Manufacturing Company, East Pittsburgh, Pa., a corporation of Pennsylvania Application February 27, 1936, Serial No. 66,011

9 Claims. (Cl. 113—112)

This invention relates to joint structures between dissimilar metals and the method of making the same.

In different industries, and particularly the refrigeration industry, where it is desired to form leak-proof joints between dissimilar metals such as a copper base metal and stainless steel, it is found that the joint formed by soldering the copper base metal and the steel is structurally weak, the solder failing to so fuse with the stainless steel as to effect a good bond therewith. The soldered joint is easily affected by moisture, corrosion weakening the bond with the steel and causing the joint to fail.

An object of this invention is to provide a leak-proof joint between dissimilar metals.

A more specific object of this invention is to provide a leak-proof joint that is unaffected by moisture between a copper base metal member and a stainless steel member.

Another object of this invention is the provision of a method for making leak-proof joints between dissimilar metals.

Other and additional objects of this invention will be apparent from the following description when taken in conjunction with the accompanying drawings in which:

Figure 1 is a sectional view of a joint formed between a tubular copper base metal member and a stainless steel member as embodied in the teachings of this invention;

Fig. 2 is a sectional view taken along line II—II of Fig. 1;

Figure 3:
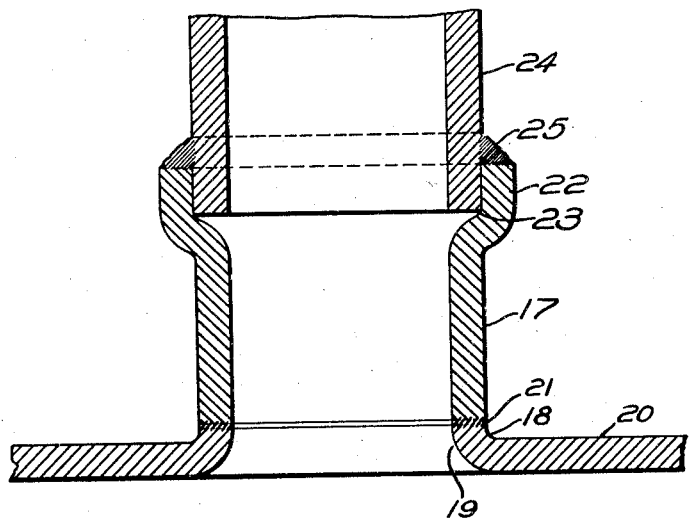
Fig. 3 is a sectional view of a joint formed between dissimilar metals in accordance with a modification of this invention.

Referring to the drawings and particularly to Fig. 1 thereof, this invention is illustrated by reference to a joint formed between a stainless steel member 10, representative of the walls of the evaporator of a refrigerator, and a copper base metal tubular member 11, such as copper or brass, representative of the coils commonly employed in a refrigerator. The end of the tube 11 is positioned in an opening 12 in the member 10 which is adapted to receive the tube.

Before positioning the end of the tube 11 in the opening 12 in the stainless steel member, a non-ferrous intermediate metal member 13 in the form of a washer having an opening 14 therein as shown in Fig. 2 is so disposed on the member 10 that the opening 14 of the intermediate member is in alinement with the opening 12 in the stainless steel member. The two openings are of the same diameter, the inner wall of each of the members coinciding with each other and with the outer wall of the tube 11.

In practice, the non-ferrous intermediate member comprises either a tin bronze composed of from 5% to 10% tin, 0% to 5% phosphorus and 90% to 95% copper or a silicon bronze composed of substantially 1% to 5% silicon, 2% tin, 2.5% iron, 5% zinc with a maximum of 1.5% manganese, with the balance substantially copper.

When the intermediate member 13 is disposed on the stainless steel member 10, they are welded together by a resistance weld 15 to bond them together and form a leak-proof joint therebetween. When welded together in this manner, the different metals of the two members fuse and form an alloy along the line of the weld. The welding of the members may be accomplished either by a projection weld or by a series of overlapping spot welds. The alloy formed by the fusion of the two members is resistant to corrosion and the joint formed thereby will not be weakened by exposure to moisture.

When the intermediate member 13 is welded to the stainless steel member 10, the end of the tube 11 is positioned in the alined openings 12 and 14. The tube is then soldered to the intermediate metal member as shown at 16.

In practice, either a silver solder consisting of from 7% to 70% silver, 20% to 80% copper, 15% to 50% zinc and about 4% cadmium or a phosphorus copper solder consisting of about 7.5% phosphorus with the balance copper is employed. The heat of either of these solders when applied in the molten state to the metals is sufficient for causing a fusion of the solder with the copper base tube 11 and the non-ferrous intermediate metal member 13. The joint formed between the tubular member and the intermediate member is leak-proof and is not affected by moisture.

Where spot welding is employed for welding the members 13 and 10 together, the intermediate members 13 may be positioned on the stainless steel member 10 by utilizing an electrode for the spot welding operation which has a pilot suitable for alining the opening in the intermediate member with the opening in the stainless steel member. The positioning of the intermediate member and the welding of it to the stainless steel member may therefore be accomplished as one step in the operation.

In a modification of this invention, as shown in Fig. 3 of the drawings, the intermediate non-ferrous member is in the form of a tube 17, one end of which seats on the outwardly turned edges 18 forming the opening 19 in a stainless steel member 20. The contacting surfaces of the edges of the tube 17 and the stainless steel member 20 are welded together as by a butt weld 21. The welding of the contacting surfaces causes a fusion of the metals of the two members to form an alloy that is not affected by moisture.

The other end of the non-ferrous intermediate member 17 is off-set as at 22 to form a seat 23 for receiving the end of a copper base metal tube 24. When the tube 24 is positioned in the seat 23 of the tube 17, the copper base metal member 24 is soldered to the edge of the off-set end 22 of the non-ferrous intermediate member by means of a solder 25 such as the silver solder or phosphorus copper solder as hereinbefore described.

Figure 4:
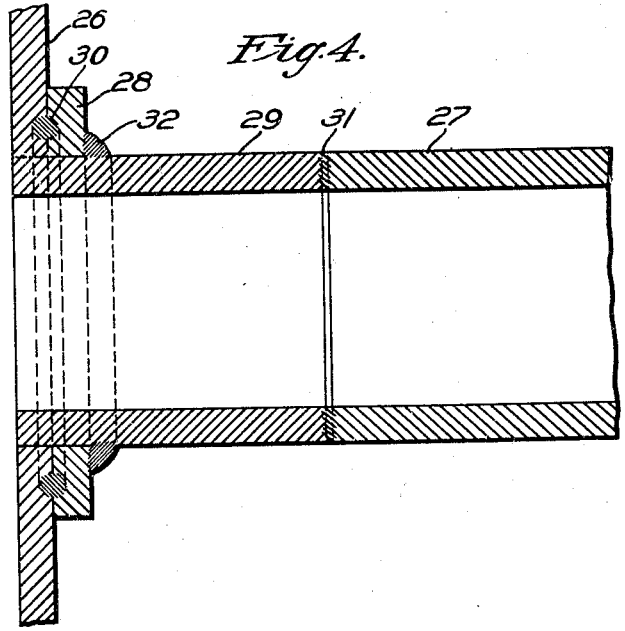
Fig. 4 is a sectional view of a joint formed between dissimilar metals in accordance with another modification of this invention.

Another modification of the joint structure is shown in Fig. 4 of the drawings in a joint structure formed between two stainless steel members 26 and 27. In this structure intermediate non-ferrous members 28 and 29 are associated with each of the stainless steel members 26 and 27, respectively.

Leak-proof joints are formed between the stainless steel members and the associated non-ferrous members by welding their contacting surfaces together. In practice, the non-ferrous member 28 is welded to its associated stainless steel member 26 by means of a resistance weld 30 comprising either a projection weld or a series of overlapping spot welds such as are known in the art. The non-ferrous member 29 is welded to its associated stainless steel member 27 by means of a butt weld 31. Both of the welded joints between the non-ferrous members and their respective stainless steel members provide joints therebetween that are leak-proof and unaffected by moisture.

After the stainless steel members and their associated non-ferrous members are securely welded together, the non-ferrous member 29 is placed in the desired position with respect to the non-ferrous member 28 and its associated stainless steel member 26. The non-ferrous members 28 and 29 are then securely soldered together as at 32 by means of the aforementioned silver solder or phosphorus copper solder.

By providing a joint between the dissimilar metals in the manner hereinbefore described, it is evident that a joint is formed therebetween that is structurally strong because of the fusion of the metals of the adjoining members.

Although this invention has been described with reference to a particular embodiment thereof, it will be understood by those skilled in the art that it is also adapted to other applications. This invention is therefore not to be restricted except insofar as necessitated by the prior art and the scope of the appended claims.

I claim as my invention:

1. In a joint structure, in combination, a stainless steel member, an intermediate non-ferrous metal member selected from the group consisting of silicon-bronze and tin-bronze alloys disposed on the stainless steel member, the intermediate member being fused to the stainless steel member by a resistance weld to effect a leak-proof joint therebetween, and a copper base metal member soldered to the intermediate member to effect a leak-proof joint therebetween.

2. In a joint structure, in combination, a stainless steel member, an intermediate silicon-bronze member disposed on the stainless steel member, the intermediate member being fused to the stainless steel member by a resistance weld to effect a leak-proof joint therebetween, and a copper base metal member disposed in contacting engagement with the intermediate member, the copper base metal member being soldered to the intermediate silicon-bronze member with a silver solder, the silver solder effecting a leak-proof joint between the copper member and the silicon-bronze member.

3. In a joint structure, in combination, a stainless steel member, an intermediate silicon-bronze member disposed on the stainless steel member, the intermediate member being welded to the stainless steel member to effect a leak-proof joint therebetween, and a copper base metal member disposed in contacting engagement with the intermediate member, the copper base metal member being soldered to the intermediate silicon-bronze member with a phosphorus copper solder, the phosphorus copper solder effecting a leak-proof joint between the soldered members.

4. In a joint structure, in combination, a stainless steel member, an intermediate tin-bronze member disposed on the stainless steel member, the intermediate member being fused to the stainless steel member by a resistance weld to effect a leak-proof joint therebetween, and a copper base metal member disposed in contacting engagement with the intermediate member, the copper base metal member being soldered to the intermediate tin-bronze member with a silver solder, the silver solder effecting a leak-proof joint between the copper base metal member and the tin-bronze member.

5. In the method of joining a copper base metal member to a stainless steel member, in combination, resistance-welding an intermediate non-ferrous metal member selected from the group consisting of silicon-bronze and tin-bronze alloys to the stainless steel member and soldering the copper base metal member to the intermediate non-ferrous metal member.

6. In the method of attaching a copper tube to a stainless steel member having an opening therein to receive the copper tube, in combination, positioning an intermediate non-ferrous metal member on the surface of the stainless steel member about the opening therein, the intermediate non-ferrous member having an opening therein of a shape and size similar to the opening in the steel member, resistance-welding the intermediate non-ferrous member to the stainless steel member, positioning the copper tube in the openings in the non-ferrous member and the stainless steel member, and soldering the copper tube to the non-ferrous member to provide a leak-proof joint between the members.

7. In the method of attaching a copper tube to a stainless steel member having an opening therein, in combination, positioning an intermediate silicon-bronze member on the surface of the stainless steel member about the opening therein, the intermediate member having an opening therein of a shape and size similar to the opening in the stainless steel member, welding the intermediate member to the stainless steel member to cause a fusion of their contacting surfaces when the openings in the members are concentric, positioning a copper tube in the concentric openings in the intermediate and stainless steel members, and soldering the copper tube to the intermediate member to provide a leak-proof joint between the tube and the members.

8. In a joint structure, in combination, a stainless steel member having an opening therein, an intermediate non-ferrous tubular metal member disposed on the stainless steel member about the said opening, one end of the tubular intermediate member being fused to the stainless steel member by a resistance weld to provide a leak-proof joint therebetween, and a copper tubular member soldered to the other end of the tubular intermediate member.

9. In a joint structure, in combination, a stainless steel member, a non-ferrous member associated with the stainless steel member, the said non-ferrous member and stainless steel members being welded together to effect a leak-proof joint therebetween, a second non-ferrous member being soldered to the said non-ferrous member to effect a leak-proof joint between them, and a second stainless steel member welded to the said second non-ferrous member, the soldered and welded joints between the members providing a leak-proof joint structure that is unaffected by moisture.

MARTIN G. SATEREN.